United States Patent [19]
Wahlmark

[11] 3,818,721
[45] June 25, 1974

[54] CONSTANT VELOCITY UNIVERSAL DRIVE
[75] Inventor: Gunnar A. Wahlmark, Dixon, Ill.
[73] Assignee: Wahlmark System, Inc., Dixon, Ill.
[22] Filed: Sept. 15, 1972
[21] Appl. No.: 289,585

[52] U.S. Cl............................ 64/21, 64/8, 64/17 R
[51] Int. Cl.............................................. F16d 3/30
[58] Field of Search............ 64/21, 7, 8, 17 A, 17 R

[56] References Cited
UNITED STATES PATENTS

| | | | |
|---|---|---|---|
| 1,676,322 | 7/1928 | Chilton | 64/17 R |
| 2,125,615 | 8/1938 | Kittredge | 64/7 |
| 2,235,002 | 3/1941 | Anderson | 64/7 |
| 2,910,845 | 11/1959 | Wahlmark | 64/21 |
| 2,952,144 | 9/1960 | Holmes, Jr. | 64/17 A |
| 2,969,659 | 1/1961 | Sharp | 64/21 |
| 3,125,870 | 3/1964 | Orain | 64/21 |
| 3,357,210 | 12/1967 | Dean | 64/21 |
| 3,381,497 | 5/1968 | Allen | 64/21 |
| 3,490,251 | 1/1970 | Roethlisberger | 64/8 |
| 3,714,798 | 2/1973 | Macielinski | 64/21 |

FOREIGN PATENTS OR APPLICATIONS

| | | | |
|---|---|---|---|
| 1,175,941 | 4/1959 | France | 64/21 |

*Primary Examiner*—Samuel Scott
*Assistant Examiner*—Randall Heald
*Attorney, Agent, or Firm*—Lee & Smith

[57] ABSTRACT

A universal drive employing at least one constant velocity universal joint of the three-roller type employing a trunnion member and a track member. The trunnion member carries three drive rollers rotatably secured for universal tilting on respective trunnions which are rigidly secured in equiangularly spaced relation with their axes defining a plane perpendicular to the axis of rotation of the trunnion member. Each of the rollers has a generally cylindrical outer peripheral surface disposed in close-fitting, rolling relationship in one of three equiangularly spaced drive channels or tracks formed in the track member. Each of the channels is defined by a pair of opposed parallel flat surfaces also parallel to the axis of the track member. As the two members rotate in driving relation with their axes angularly disposed, the roller peripheral surfaces roll against the channel surfaces and the rollers also tilt universally on their trunnions as required to accommodate relative orbital movement of the centers of the members with respect to one another. The resulting drive is constant velocity with high torque capacity at any desired joint angle, from 0° up to angles of approximately 50°. The joint may be arranged for relative axial shifting between the members, or, if desired, axial shifting can be eliminated. When axial shifting is provided, it is accommodated in the track member to eliminate axial forces which would otherwise be generated in shifting the trunnion member axially. The joints themselves may be employed singly, or combinations of two or more joints may be connected in series to provide a complete universal drive.

21 Claims, 17 Drawing Figures

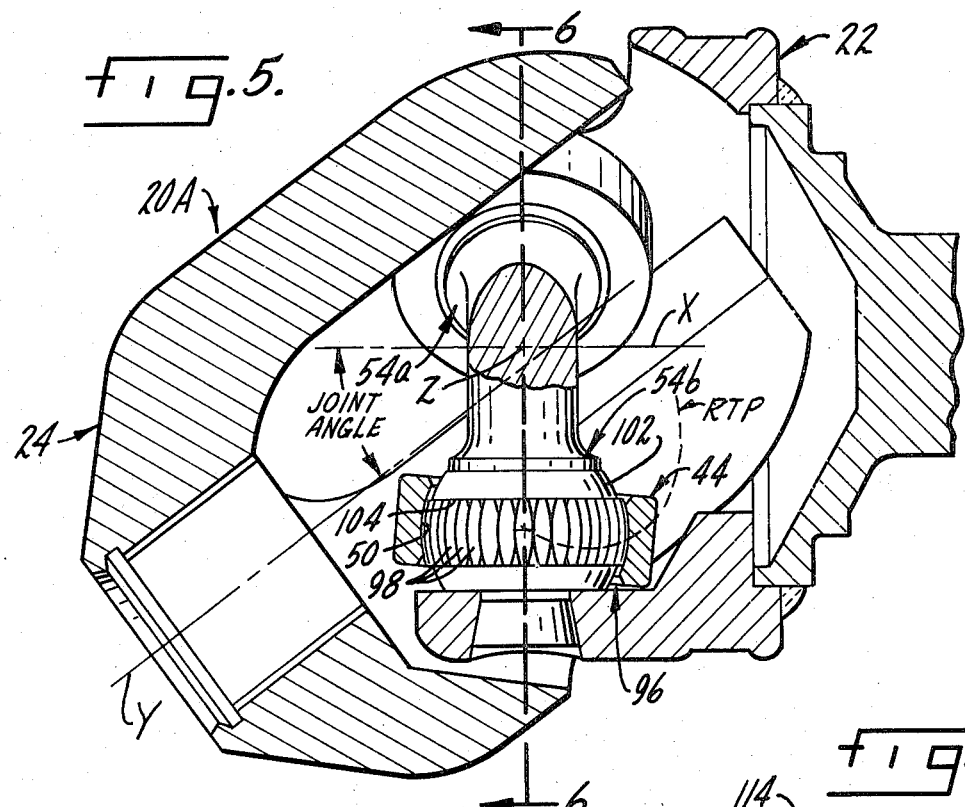
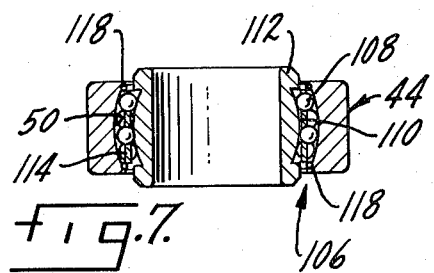
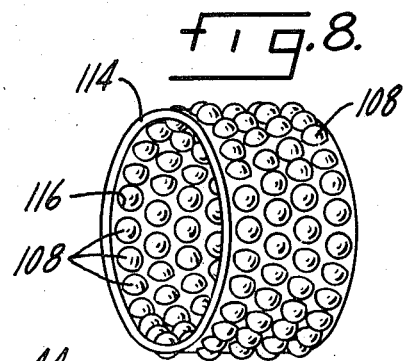
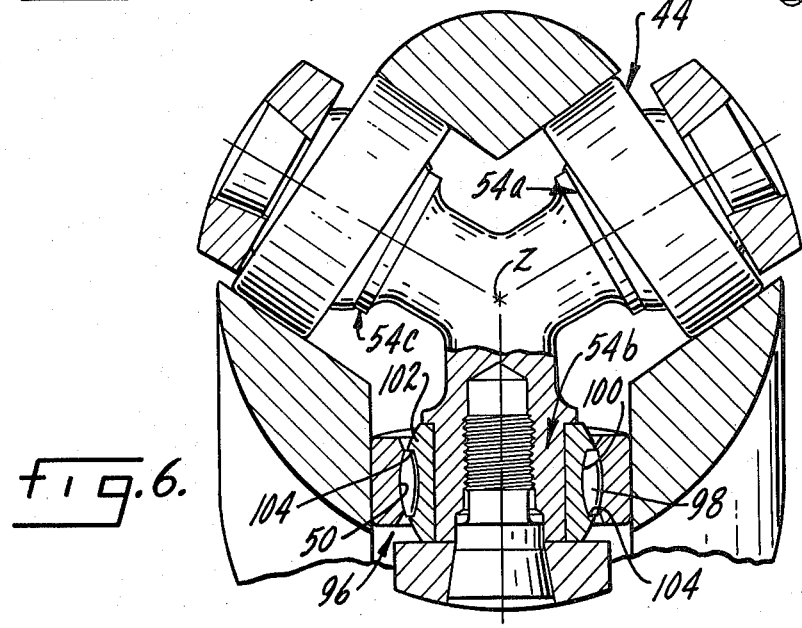

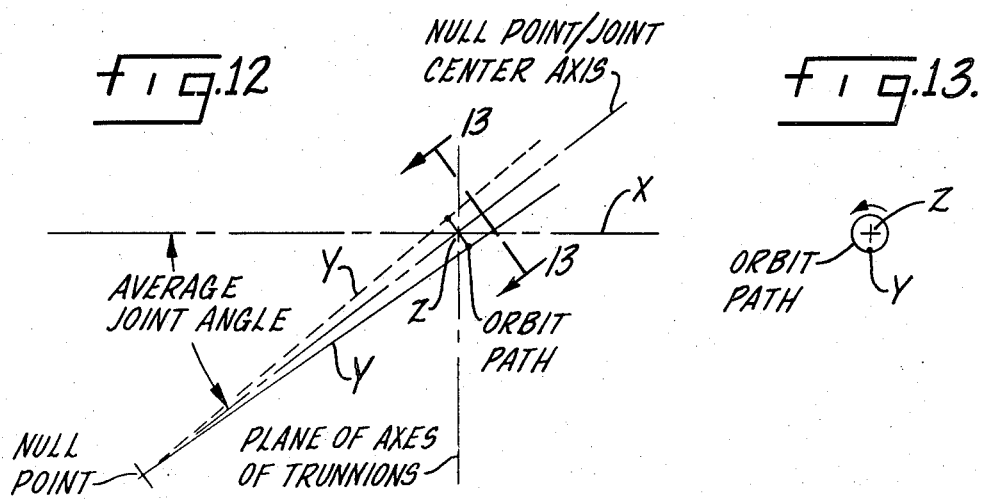
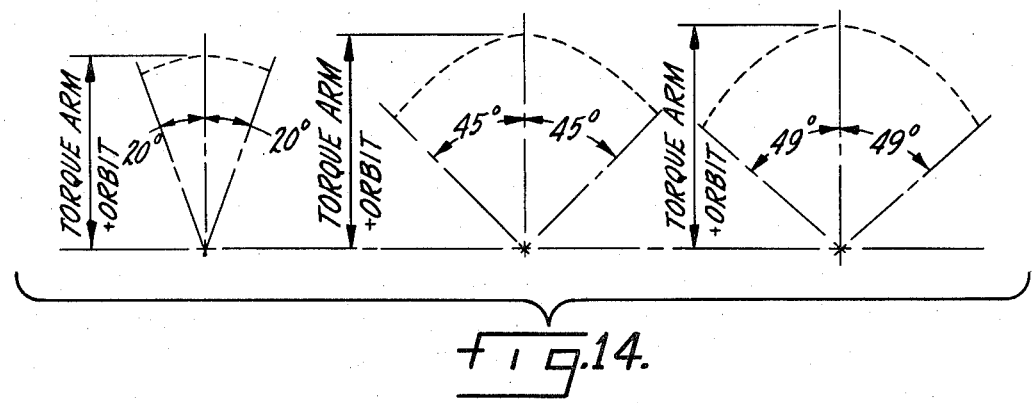
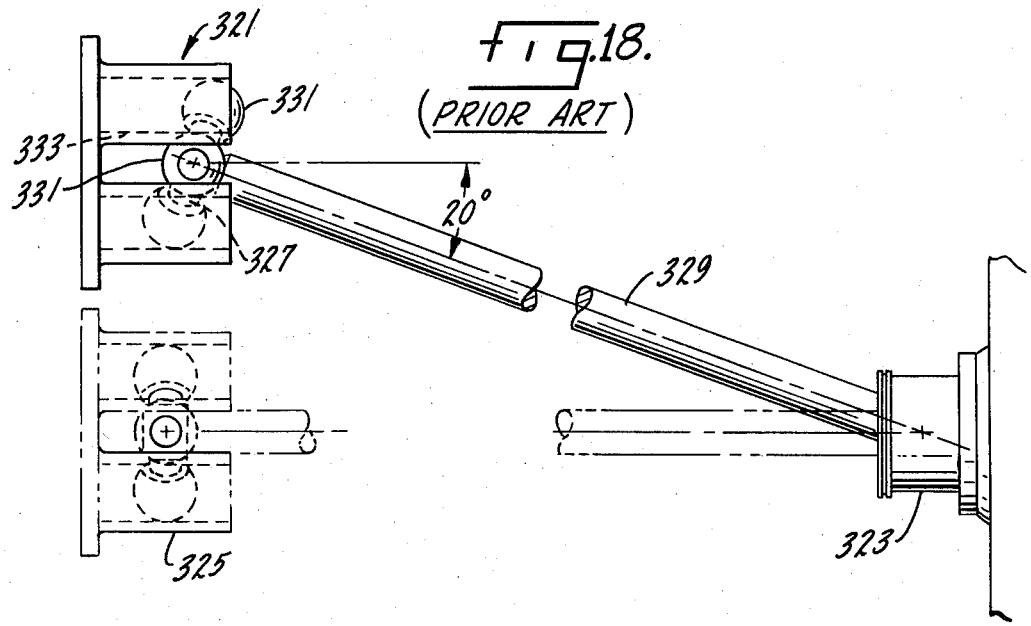

CONSTANT VELOCITY UNIVERSAL DRIVE

SUMMARY OF THE INVENTION

1. The Background

The invention relates to a three-roller type constant velocity universal joint in which three drive rollers are carried by one joint member and are engaged in respective drive channels formed in the other joint member to provide constant velocity universal drive while the axes of the two members are at an angle. The invention also relates to a universal drive incorporating at least one such three-roller type constant velocity joint.

Constant velocity universal joints of the three-roller type are exemplified by applicant's "Constant Velocity Joint," disclosed and claimed in U.S. Pat. No. 2,910,845 issued Nov. 3, 1959. As far as applicant is aware, the joint disclosed in this patent is the first successful three-roller constant velocity joint. Three-roller joints according to the patent have been widely used in hydraulic mechanisms employed in the aerospace industry.

Earlier efforts to provide universal joints of the three-roller type are disclosed, for example, by Kittredge U.S. Pat. No. 2,125,615 issued Aug. 2, 1938, Anderson U.S. Pat. No. 2,235,002 issued Mar. 18, 1941, and Ayer British Pat. No. 143,654 accepted June 3, 1920.

Subsequent to disclosure of applicant's joint in U.S. Pat. No. 2,910,845 other three-roller joints of the same character have been successfully employed in the automotive industry as universal joints in the drive trains supplying torque to the driving wheels of automobiles. One such automotive use is disclosed in an article of J. M. Roethlisberger and F. C. Aldrich, entitled "The Tri-Pot Universal Joint," published by the Society of Automotive Engineers pursuant to an engineering congress held in Detroit, Mich., Jan. 13–17, 1969. The article discloses the use of three-roller type universal joints in the front wheel drive systems employed in the Oldsmobile Toronado and Cadillac Eldorado automobiles. Similar three-roller joints of a French Company, Glaenzer Spicer S.A., are depicted in Orain U.S. Pat. No. 3,125,870 issued Mar. 24, 1964, versions of which have reportedly been used in certain Peugot (French) and SAAB (Swedish) automobiles.

To applicant's knowledge, he was the first to recognize and to successfully accommodate the relative "weaving" or "orbiting" of the centers of the two joint members of a three-roller joint as the members are rotated with their axes at an angle. In applicant's three-roller joints according to his U.S. Pat. No. 2,910,845 and in subsequent successful three-roller joints, weaving or orbiting has been accommodated by making the drive rollers slidable on trunnions fixed at right angles to the axis of the one joint member while confining and controlling the positions of the rollers in the respective drive channels in the other joint member.

This requirement for providing sliding or axial shifting simultaneous with rotation of the drive rollers becomes increasingly difficult to accommodate as torque loads and joint angles become larger.

An additional complication is added in such prior art constructions by the necessity for controlling the positions of the drive rollers, inasmuch as the control means must be provided in the joint member having the drive channels rather than in the member which carries the rollers. This causes manufacturing and operational difficulties, requires more space, and limits the maximum permissible joint angle as well as the maximum permissible relative axial shifting between the joint members.

It should also be noted that the peripheral surfaces of the drive rollers of such prior art joints have been necessarily spherically fashioned in order to permit the trunnions carrying the rollers to tilt universally relative to the side surfaces of the drive channels as the joints were rotated with the axes of the two members at an angle. Although the tilting of the trunnions relative to the channels is small in comparison to the joint angle between the axes of the members, it increases with increase in joint angle and must be accommodated in order for such joints to operate.

2. The Invention

Applicant has discovered that the intricately interrelated movements of elements in a three-roller joint can be accommodated in an entirely different manner, that is, by rotatably securing the rollers to their trunnions through universal bearings. He has further discovered that such universal bearings need not accommodate axial shifting of the rollers on the trunnions. According to this invention the inherent weaving or orbiting of one joint member relative to the other can be accommodated by permitting the drive rollers carried by one member to freely shift in and out in the drive channels of the other joint member. Contrary to what might be expected, this shifting in and out does not cause sliding of the drive rollers in the channels, but instead the rollers describe a rolling path against the sides of the drive channels.

As the joint of the present invention rotates under torque with the axes of the joint members at an angle, the universal bearings connecting the drive rollers to the respective trunnions permit the rollers to tilt universally as required to provide a rolling path of movement of the roller peripheries against the respective drive channel sides, much the same as a caster wheel follows the path of least resistance except that the "castering" of the drive rollers is universal. At the same time roller tilt exactly accommodates the required universal tilting of the trunnions relative to the drive channels so that the roller peripheries may be cylindrical rather than spherical. The drive channels may thus be flat and need not be provided with means for controlling the positions of the rollers in the channels, either outwardly or inwardly, inasmuch as the rollers are secured against axial shifting on the respective trunnions.

The resulting three-roller joint of the present invention provides exactly constant velocity universal drive at all joint angles with a minimum of friction. The construction is simplified and the resulting manufacturing cost is reduced. At the same time the torque load carrying capacity is increased for a given size of joint, and for any given configuration the maximum permissible joint angle is advantageously increased compared to applicant's earlier type of three-roller joint.

In certain universal joint applications it is necessary to provide some means for accommodating axial shifting or travel of the joint members relative to one another as the joint angle is changed. In the joint of the present invention the permissible amount of axial travel of one joint member relative to the other is increased for a given size of joint. This is particularly advantageous for automotive drive applications where the distance between the driving wheels and the drive gearing changes as the wheels jounce and rebound.

Succinctly, the joint of the present invention is superior to all prior art three-roller joints of which applicant is aware in every important factor, that is, operation, load carrying capacity, joint maximum angle, joint axial shifting, size, ease of manufacture, durability and cost.

In addition to the important advantages afforded by the new constant velocity joint itself, the present invention contemplates another significant advantage in a universal drive incorporating an axial-travel type three-roller joint in series with a non-axial-travel joint. Applicant's multi-joint universal drive is arranged so that the axial travel is accomplished without axial load and without adding to the mass of any element driven through the axial-travel joint. Specifically, this arrangement corrects the deficiences of automotive front wheel drive mechanisms of which applicant is aware, in which axial movement requires the drive rollers to work against a varying axial thrust to accommodate axial travel and in which the mass of the roller-carrying member and associated parts is disadvantageously added to the unsprung mass of the drive wheels.

BRIEF DESCRIPTION OF THE DRAWINGS

The invention is illustrated in the following drawings in which:

FIG. 5 is a longitudinal sectional view similar to that of FIG. 3 but illustrating a second embodiment of universal bearing for securing the drive rollers on their respective trunnions and also showing the universal joint rotated 60° (in either direction) so that one of the drive rollers is shown in the bottom position rather than in the top position as shown in FIG. 3;

FIG. 6 is a transverse sectional view taken along line 6—6 of FIG. 5;

FIG. 7 is a sectional view of one drive roller showing a third embodiment of bearing for connecting drive rollers on their respective trunnions;

FIG. 8 is an enlarged perspective view showing the ball and cage portion of the bearing of FIG. 7;

FIG. 12 is a schematic line drawing illustrating the orbiting or weaving of one of the joint members relative to the other as the universal joint is rotated with the axes of the respective members at an angle;

FIG. 13 is a schematic line drawing view taken along line 13—13 of FIG. 12 to further illustrate the orbiting;

FIG. 14 is a series of schematic views illustrating the roller track pattern traced by the one of the drive rollers against one side of one of the drive tracks as the joint is rotated at three different joint angles;

FIG. 18 is a fragmentary sectional view similar to FIG. 17 but showing a prior art front wheel drive system in neutral and maximum jounce positions to illustrate the axial force and unsprung weight problems.

DETAILED DESCRIPTION

1. Preface

Figure 15:
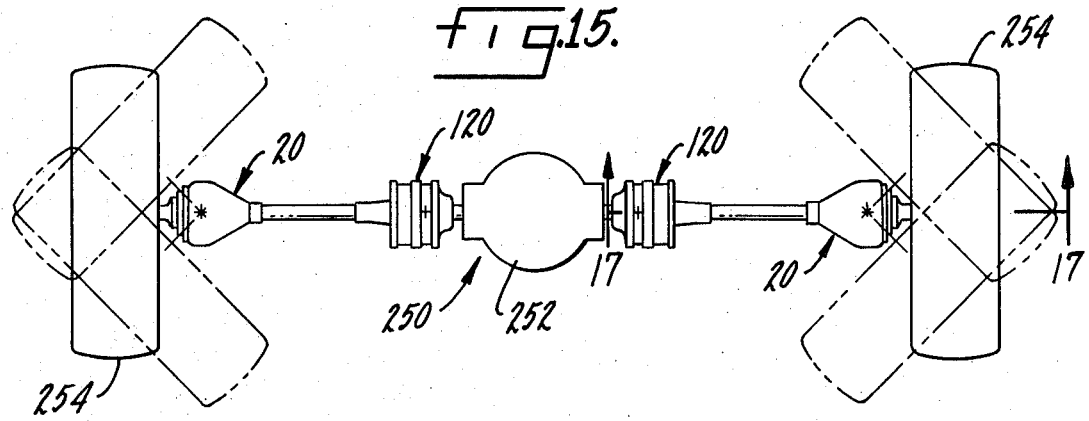
FIG. 15 is a schematic top elevational view of a front wheel drive system for an automotive vehicle utilizing constant velocity universal joints according to the present invention and further illustrating an improved arrangement of universal joints for front wheel drive.
Figure 16:
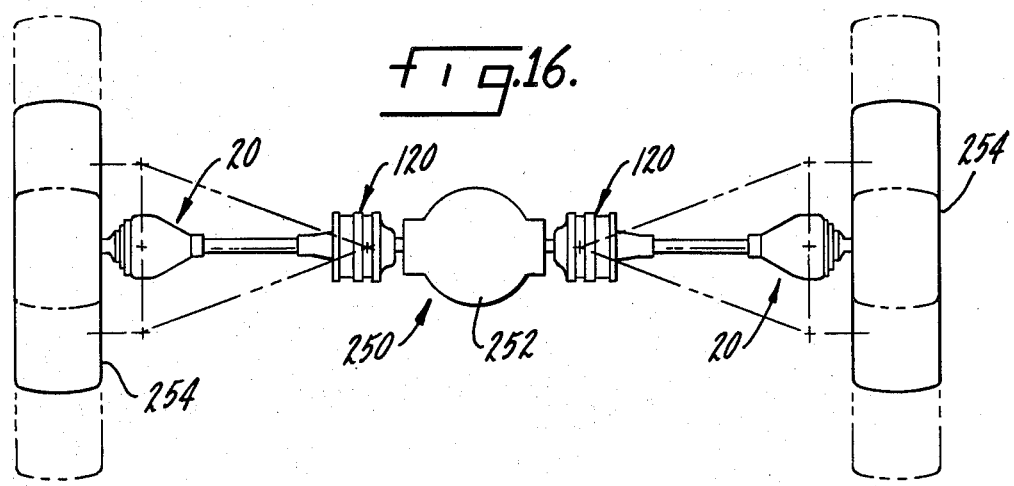
FIG. 16 is a schematic front view of the front wheel drive system of FIG. 15.
Figure 17:
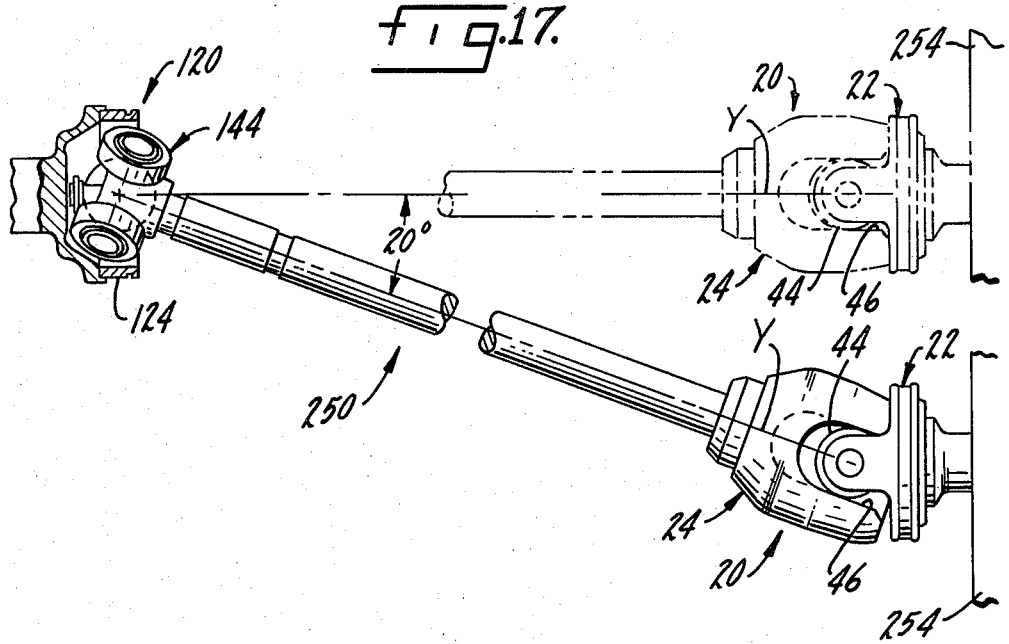
FIG. 17 is an enlarged fragmentary sectional view taken generally along line 17—17 of FIG. 15 and showing the universal joints in more detail to illustrate the arrangement for eliminating axial force and for reducing unsprung mass in the front wheel drive system.

The three-roller type constant velocity universal joint of the present invention provides constant velocity drive from one joint member to the other member regardless of the joint angle up to the maximum angle permissible. The new type of constant velocity joint provides improved means for accommodation of weaving or orbiting of the center of one of the members with respect to the center of the other as the joint is rotated at an angle while at the same time providing improved means for maintaining and controlling the positions of the drive rollers as the joint rotates. The joint may be utilized in any drive mechanism requiring constant velocity universal drive, for example, a swash plate type hydraulic mechanism as depicted in applicant's U.S. Pat. No. 2,910,845 or an automotive front wheel drive system as shown in FIGS. 15–17 of this application.

As distinguished from applicant's prior patent and from all other prior art relating to three-roller joints of which applicant is aware, the present invention accommodates weaving or orbiting and controls the positions of the drive rollers by fixing the positions of the drive rollers on their trunnions while at the time providing for universal tilting of the drive rollers relative to the trunnions. This permits the use of cylindrically-surfaced drive rollers on one joint member and flat tracks in the other member. The basic differences from prior art joints provide a number of important advantages as will appear hereafter.

2. The Joint Embodiment of FIGS. 1 through 4

The constant velocity universal joint of FIGS. 1 through 4 is generally designated by the reference numeral 20. The joint 20 includes two major portions, a trunnions member 22 having a rotational axis X and a track member 24 having a rotational axis Y. Either the trunnion member 22 or the track member 24 may be used as the drive member of the joint with the other acting as the driven member. In this specification and in the claims the term "joint angle" means the angle between the axis of the trunnion member and the axis of the track member. The term "plane of the joint" or "joint plane" refers to the plane defined by axes X and Y of the trunnion member and the track member when these axes are disposed at some joint angle other than 0°.

As will be described in more detail, the trunnion member 22 and the track member 24 are drivingly interconnected so that when rotated with their axes at any angle up to the maximum permissible, the angular velocities of the two members are always exactly the same regardless of the position in a rotational cycle of 360°. Thus, the joint assembly 20 always provides what is generally referred to as "constant velocity" drive, as distinguished from the drive provided by "nonconstant velocity" universal joints which are used throughout industry.

A common, widely used nonconstant velocity universal joint is the "Cardan" or "Hookes" type joint which is illustrated, for example, in "Pictorial Handbook of Technical Services," by Otto B. Schwarz and Paul Grafstein, 1971, at pages 16 and 17. As is well understood in industry, a Cardan joint provides two accelerations and two decelerations of the angular velocity of the driven shaft with respect to the angular velocity of the drive shaft for each rotation of the drive shaft, with the magnitude of the accelerations and decelerations increasing geometrically as the joint angle increases from 0° toward the maximum permissible angle. Hence, nonconstant velocity universal joints, such as the Cardan joint, are generally unacceptable in machinery where substantial joint angles must be accommodated, for example, angles over 10° to 15°. Furthermore, nonconstant velocity joints are unacceptable for use in precision machinery regardless of the angle of the joint over a very few degrees because of the driven shaft accelerations and decelerations.

The constant velocity universal joint 20 of this invention is of the "three-roller" type. To applicant's knowledge, the first successful embodiment of the three-roller type joint is described and claimed in applicant's prior U.S. Pat. No. 2,910,845 identified in the foregoing Summary of Invention. The improved three-roller constant velocity joint of the present invention provides important advantages of increased maximum joint angularity, increased torque carrying capacity, durability, improved performance and decreased manufacturing costs as compared with applicant's earlier patented three-roller joint and with other similar commercial three-roller joints which followed.

Referring to FIGS. 1 through 4, the trunnion member 22 of the joint 20 includes a shaft section 26 and a trunnion carrying section 28, both formed of tough metal such as forged steel. While the two sections 26 and 28 could be manufactured as one piece if desired, for ease of fabrication they are fabricated separately and are subsequently welded together at 30.

The shaft section 26 of the trunnion member 22 includes an integral splined shaft portion 32 with an integral reduced diameter threaded end portion 34 for connection to a mating portion of mechanism (for example, as shown in FIGS. 15–17) to which the joint member 20 may be connected for operation.

The track member 24 of the joint includes a track section 36 and a shaft section 38. The two sections are fixedly secured to one another by means of interengaging splines 40 and a conventional lock ring 42. The shaft section 38 may be connected in any suitable manner to another cooperating portion of the mechanism (that of FIGS. 15–17, for example) with which the joint may be utilized.

The constant velocity drive interconnection between the trunnion member 22 and the track member 24 is provided through three drive rollers 44 which are carried by the trunnion member and which are engaged in respective drive channels or tracks 46 formed in the track member.

Each of the drive rollers 44 is of annular, ring-like configuration with a generally cylindrical outside peripheral surface 48 and an inside segmental spherical surface 50. The spherical surface 50 has its center on the cylindrical axis of the cylindrical surface 48, centrally located between parallel annular end surfaces 52. The drive rollers 44 are preferably formed of a tough metal such as high-grade steel which may be suitably hardened or surface hardened to provide stable, long-wearing qualities for the cylindrical surfaces 48 and the spherical surfaces 50.

Figure 1:
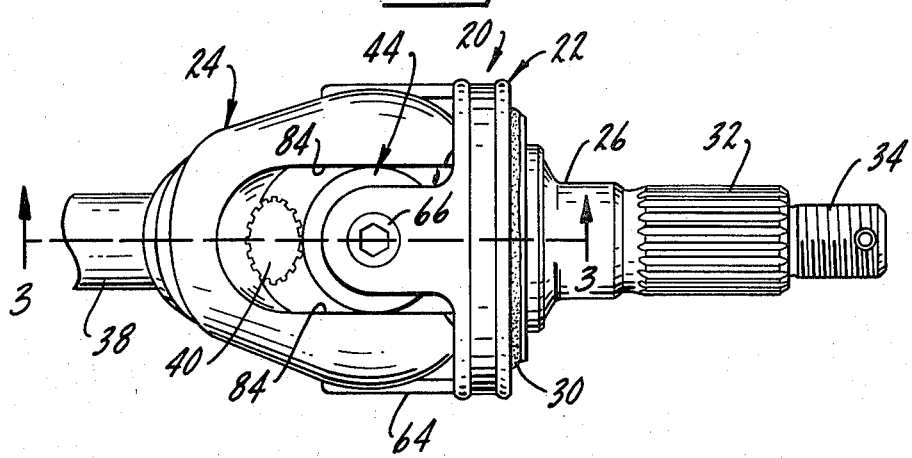
FIG. 1 is an elevational view, partly in perspective, of an axial-travel embodiment of the constant velocity universal joints according to the present invention.
Figure 2:
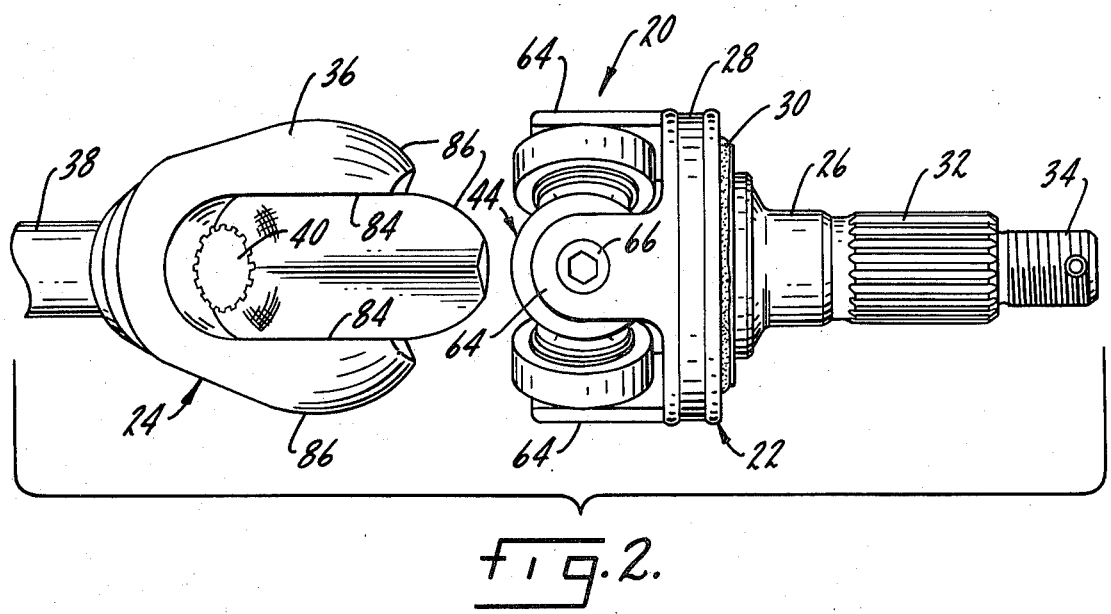
FIG. 2 is an exploded elevational view, partly in perspective, of the constant velocity universal joint shown in FIG. 1.
Figure 3:
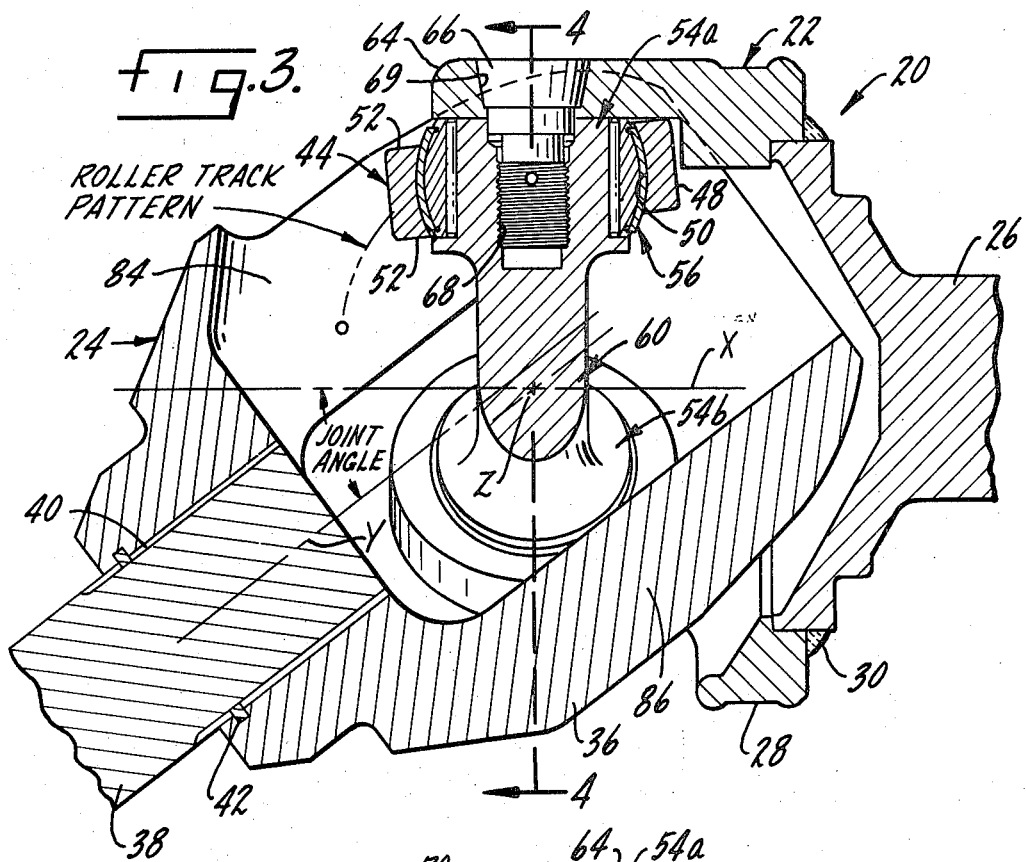
FIG. 3 is an enlarged longitudinal sectional view taken along line 3—3 of FIG. 1.
Figure 4:
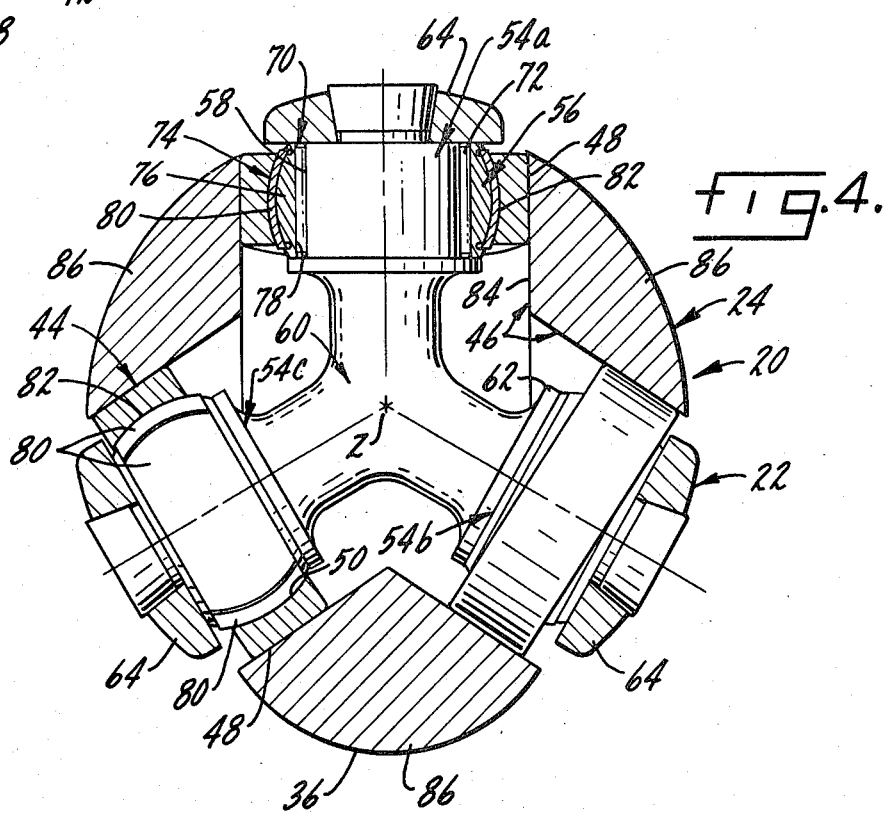
FIG. 4 is a transverse sectional view taken along line 4—4 of FIG. 3.

The drive rollers 44 are rotatably and universally pivotally secured to three trunnions 54, carried by the trunnion member 22, by means of composite bearing assemblies 56. While the trunnions are identical and are collectively identified by the reference numeral 54, for convenience of subsequent understanding of joint operation they are individually identified as 54a, 54b and 54c as shown in FIGS. 3 and 4. The trunnions 54 are preferably formed of tough metal such as high-grade steel, and each is provided with a cylindrical bearing surface 58 which may be suitably hardened or surface hardened. Although the trunnions could be separately formed and secured to the trunnion member 22, to provide additional strength and stability, they are herein formed as integral end portions of a three-fingered spider 60. The junctures between the trunnions 54 and the spider 60 are defined by annular flanges 62 which serve as stops for the composite bearing assemblies 56.

The trunnions 54 are fixedly clamped at their radially outward ends against three axially extending fingers or lugs 64, which are formed as integral extensions of the trunnion carrying portion 28, by means of cap screws 66 which are threadedly secured in tapped holes 68 which are formed radially inwardly along the axes of the respective trunnions. The screws 66 are provided with frustoconical heads with engage in mating tapered holes 69 formed in each of the finger-like extensions 64.

Each of the composite bearing assemblies 56 comprises an inner antifriction needle bearing assembly 70, including a plurality of needle bearing members 72, and an outer spherical plain bearing assembly 74. The two bearing assemblies 70 and 74 of each of the composite assemblies 56 are separated by an annular bearing member 76 which has an inner cylindrical surface 78 forming the outer race for the needle bearing assembly 70. The inner race of each needle bearing assembly 70 is provided by the respective cylindrical bearing surfaces 58 of the trunnions 54. Each bearing member 76 is disposed between the respective fingers 64 and the annular flanges 62 with close-fitting running clearance, so that each bearing member is rotatably supported in antifriction bearing fashion by the respective needle bearing assemblies 70.

Each of the spherical plain bearing assemblies 74 preferably comprises three segmental bronze portions 80 which are fixedly secured to the radially outward surface of the annular bearing member 76 and which are formed with complementary segmental spherical outer surfaces providing a segmental spherical plain bearing surface 82 which bears slidably in close-fitting plain bearing fashion against the inner segmental spherical surface 50 of the respective drive roller 44.

Accordingly, through the composite bearing assemblies 56 each of the drive rollers 44 is rotatably secured in a fixed axial position on a respective trunnion 54, and at the same time each drive roller is also universally pivotally secured at this position. Since the drive roller surfaces 48 are cylindrical rather than spherical as in applicant's earlier patented three-roller joint, the universal mounting of the rollers is required to accommodate the relative weaving or orbiting of the shafts X and Y as the joint rotates with the axes at an angle. This is described in more detail herein after the description of the various joint embodiments.

To complete the constant velocity drive interconnection between the trunnion member 22 and the track member 24, the drive tracks 46 of the track member are each defined by a pair of flat parallel track surfaces 84 which are accurately formed and spaced from one another to closely confine the respective drive rollers 44 with a very slight running clearance. Accordingly, the cylindrical surface 48 of each of the associated drive rollers 44 contacts only one of the drive track surfaces 84 at a time. The parallel pairs of drive track surfaces 84 are also parallel to the longitudinal axis Y of the track member 24, and each parallel pair of surfaces is equally spaced from the axis of the track member. The drive tracks are angularly disposed 120° apart to correspond to the angular spacing of the trunnions 54 of the trunnion member 22.

The drive surfaces 84 of the drive tracks are also formed as pairs of adjacent surfaces of three elongated cantilevered drive arms 86 which are formed integrally with the track section 36 of the track member 24. The material of the track section 36 is of tough metal such as high-grade steel and is suitably hardened or surface hardened where required to provide the strength, ridigity, stability and wear qualities necessary for proper operation and torque capacity of the constant velocity joint 20.

To give a general idea of the size and torque capacity of a particular design of constant velocity joint 20 as shown in FIGS. 1 through 4, the joint shown may be constructed with an outer diameter of approximately 4 ⅜ inches of the trunnion member 22 and with the other parts of approximately proportionate dimensions. For example, the maximum outer diameter of the track member 24 may be approximately 4 ⅛ inches, and the drive rollers 44 may be approximately 2 inches in diameter and approximately 5/8 of an inch in width. For convenience of manufacture the generally cylindrical drive surfaces 48 of the drive rollers 44 may be slightly crowned in the amount of approximately 0.001 inches, that is, the diameter at the center is approximately 0.001 inches larger than the diameter at the edges. Adequate running clearance for manufacturing purposes and for proper operation may be afforded by spacing opposed pairs of drive track surfaces 84 approximately 0.001 inches (or more if permissible) greater than the maximum center diameter of the drive rollers 44.

Such a design and construction will permit a joint angle between the axes X and Y of the members which is infinitely variable between 0°0 and approximately 50°. The angle of the joint as shown in FIGS. 3 and 4 is approximately 37°. The particular configuration is capable of constant transmission of approximately 34,000 inch-pounds of torque at any joint angle within this range.

A constant velocity universal joint 20 of the size and capacity indicated might be used, for example, as the outboard steering joint of an automotive front wheel drive system as will be described in connection with FIGS. 15–17. Such a joint would be more than adequate in size, capacity and turning angle for use in a large, high powered automobile. Such automobiles of the front wheel drive type currently utilize Rzeppa type joints for the outboard steering joints.

3. The Joint Embodiment of FIGS. 5 and 6

FIGS. 5 and 6 illustrate a constant velocity universal joint 20A which is in all respects identical to the constant velocity universal joint 20 of FIGS. 3 and 4 except that a second embodiment of bearing assembly is provided for rotatably and universally tiltably mounting the drive rollers 44 on the trunnions 54. It will also be seen by reference to the positions of the trunnions 54 that the joint has been rotated 60° in a clockwise direction as seen in FIG. 6 from the position shown in FIG. 4.

As seen in FIGS. 5 and 6, composite bearing assemblies 96 are substituted for the composite bearing assemblies 56 of the embodiment of FIGS. 3 and 4 for rotatably and universally tiltably securing the drive rollers 44 on the trunnions 54. Each of the bearing assemblies 96 includes a plurality of barrel-shaped roller or needle bearings 98 disposed in an annular groove 100 formed in an inner bearing race member 102 which is fixedly secured on each of the trunnions 54. The annular groove 100 provides the inner race of the bearing assembly 96, and the outer race is formed by the segmental spherical inner surface 50 of each of the drive rollers 44. The barrel-shaped rollers 98 are retained within the grooves by means of annular shoulders 104, which define the side edges of the grooves and which are spaced apart very slightly more than the length of the rollers 98 in order to provide running clearance.

The cross-sectional peripheries of the barrel-shaped rollers 98 are such that they accurately conform to the segmental spherical inner surfaces 50 of the drive rollers 44, except for a very slight crowning (not shown) which is commonly provided in the manufacture of roller bearings. The rollers 98 also conform to the surface of the annular groove 100 of the inner race member 102, again except for a very slight crowning of the rollers relative to the race configuration.

It will be seen, therefore, that the drive rollers 44 are rotatably carried in antifriction fashion by means of the barrel-shaped rollers 98 of the bearing assembly 96. At the same time the bearing assembly provides universal tilting support for the drive rollers 44. The universal tilting occurs in antifriction bearing fashion. This is because the degree of universal tilting of the drive rollers 44 which is necessary to accommodate maximum joint angle is very small, less than 4° in a joint of the approximate dimensions previously described. As this slight tilting occurs, the drive roller rotates only about a quarter of a revolution in one direction. Since the slight universal tilting of the drive rollers 44 occurs as the rollers are rotating with the barrel-shaped roller bearings 98 also rotating, the tilting action is accommodated by antifriction rolling.

Rough bearing calculations indicate that the load carrying capacity of the composite bearing assembly 96 is comparable to the load carrying capacity of the composite bearing assembly 56 of the embodiment of FIGS. 3 and 4.

4. The Bearing Embodiment of FIGS. 7 and 8

A third embodiment of composite bearing assembly 106 for rotatably and universally tiltably supporting the drive rollers 44 on the trunnions 54 is shown in FIGS. 7 and 8. The bearing assembly of this embodiment comprises a plurality of antifriction ball bearings 108 disposed in closely spaced relation with an annular, spherically surface groove 110 formed in the outer surface of an annular bearing member 112. The annular groove 110 provides the inner race for the ball bearings 108, and the outer race is formed by the segmental spherical inner surface 50 of each of the drive rollers 44.

To maintain the spacing between the ball bearings 108, an annular cage member 114 is spaced between the segmental spherical bearing surfaces 50 and 110. The cage member is provided with a plurality of generally circular apertures 116, slightly larger in diameter than the antifriction ball bearings 108 and spaced in four circular paths about the periphery of the cage member. The balls 108 of adjacent rows are alternately staggered as shown in order to accommodate the maximum number of ball bearings.

To complete the composite bearing assembly 106 a pair of annular, split snap rings 118 may be disposed in a pair of conforming grooves formed at the opposite edge portions of the segmental spherical surface 50. The snap rings 118 provide means for preventing overtravel of universal tilting of the drive rollers 44, and they also provide centering means for the bearing cage 114 since the bearings 108 in the outer rows cannot run past the snap rings. Thus, the snap rings provide a very simple but positive means for preventing overtravel of the cage 114 and the entire bearing assembly 106.

When substituted for the bearing assemblies 56 of FIGS. 3 and 4 or the bearing assemblies 96 of FIGS. 5 and 6, the bearing assemblies 106 of FIGS. 7 and 8 accommodate totally antifriction rotation and universal tilting of the drive rollers 44 with respect to the trunnions 54. While rough calculations indicate that the bearing assemblies 106 are not capable of carrying as much torque load as the other embodiments of assemblies, the ball bearing embodiment 106 is ideal for use with a constant velocity joint which is not required to carry as great a torque load but in which all possible reduction of friction is important.

Figure 11:
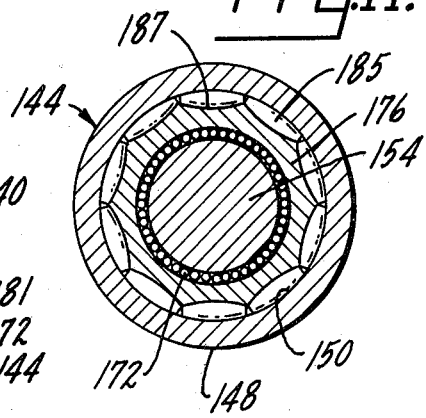
FIG. 11 is a sectional view taken along line 11—11 of FIG. 9 to further illustrate the fourth embodiment of bearing.

5. The Joint Embodiment of FIGS. 9 through 11

In some mechanical applications it is necessary to provide a universal joint in which no axial travel between the members is provided. Such is the case, for example, where two universal joints are utilized in series with one of the joints providing axial travel and with the other one constructed for preventing axial travel between the joint members. Another example is the case where two non-axial-travel joints are provided in series and any required axial travel between the joints is accommodated by some other mechanism such as a conventional slip spline (not shown).

Figure 9:
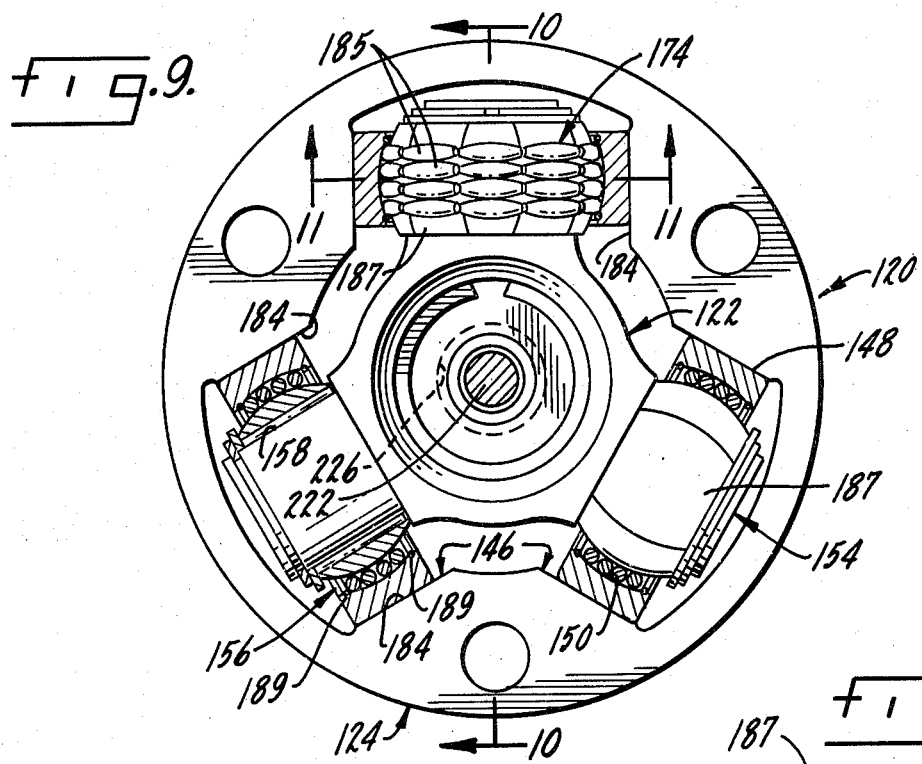
FIG. 9 is a transverse sectional view of a non-axial-travel embodiment of constant velocity universal joint according to the present invention showing the joint at 0° joint angle, and also illustrating a fourth embodiment of bearing for securing the drive rollers on their respective trunnions.
Figure 10:
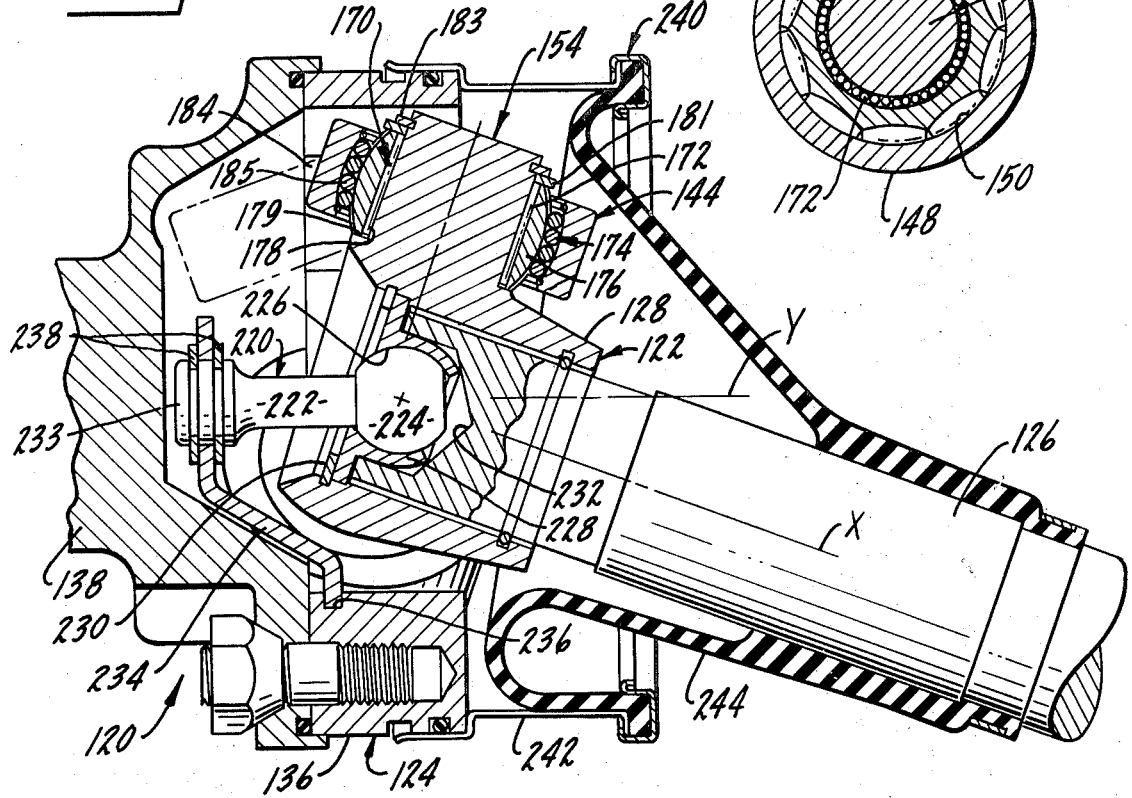
FIG. 10 is a longitudinal sectional view taken along line 10—10 of FIG. 9 but illustrating the joint at an angle of approximately 20°.

The embodiment of three-roller type constant velocity universal joint depicted in FIGS. 9 and 10 is a non-axial-travel type joint which is particularly useful, for example, as one of the pair of joints on one side of an automotive vehicle employing front wheel drive (see FIGS. 15–17). The constant velocity joint of this embodiment is generally designated by the reference numeral 120 and it includes a trunnion member 122 and a track member 124.

The trunnion member 122 includes a shaft section 126 and a trunnion section 128 which is fixedly secured to the shaft section in any suitable manner, for example, by integral formation or by the spline and snap ring construction shown in FIG. 10.

The track member 124 of the joint 120 includes a track section 136 and a shaft section 138. These two sections are fixedly secured to one another in any suitable manner, for example, by integral construction or through the flange and cap screw connection shown.

As is the case with respect to the universal joints 20 and 20A of the previous embodiments, the constant velocity drive interconnection between the trunnion member 122 and the track member 124 is afforded through three drive rollers, here designated 144, which are engaged in respective drive channels or tracks 146 formed in the track member 124. The drive rollers 144 are provided with cylindrical outer surfaces 148, which may be slightly crowned as described in connection with the other joint embodiments. In like manner the drive rollers 144 are rotatably and universally pivotally secured to three trunnions, here collectively designated by the reference numeral 154, by means of respective composite bearing assemblies 156. Each of the trunnions is provided with a cylindrical bearing surface 158. The three trunnions are fixedly secured to the trunnion section 128 of the trunnion member 122 in any suitable manner such as by being formed integrally therewith as shown, so that the axes of the trunnions are disposed in equiangularly spaced relation, that is 120° apart, to form a plane which is perpendicular to the axis X of the trunnion member 122. The drive tracks are symmetrically disposed with respect to the axis Y of the track member 124.

The composite bearing assembly 156 comprises a fourth embodiment of bearing assembly for rotatably and universally pivotally securing the drive rollers to the trunnions of the trunnion member. Each of the composite bearing assemblies 156 comprises an inner antifriction needle bearing assembly 170, including a plurality of needle bearing members 172, and an outer antifriction spherical bearing assembly 174. The two bearing assemblies 170 and 174 are separated by an annular bearing member 176 which has an inner cylindrical surface 178 forming the outer race for the needle bearing assembly 170. The inner race of the needle bearing assembly is formed by the cylindrical bearing surface 158 of the respective trunnions 154. Each bearing member 176 is disposed between an annular shoulder 179 at the juncture of the trunnion 154 and the trunnion carrying section 128 and a retainer washer 181 held in place by a snap ring 183 fitted into a groove at the outer end portion of the respective trunnions 154. The arrangement is such that the bearing member 176 is rotatably supported in antifriction bearing fashion by the needle bearing assembly 170.

Each of the spherical antifriction bearing assemblies 174 includes a plurality of barrel-shaped roller bearings 185 arranged end-to-end in four generally annular rows about the outer peripheral portion of the annular bearing member 176. The barrel-shaped rollers 185 are disposed in groups of four in conforming grooves 187 which are formed about a center located at the central point of the cylindrical axis of the member 176 and thus forming a plurality of inner races for groups of four of the barrel-shaped rollers 185. A common outer race for all of the barrel-shaped rollers is provided by a spherically formed inner surface 150 of each of the drive rollers 144. The antifriction spherical bearing assembly 174 is completed by a pair of snap rings 189 similar in placement and function to the snap rings 118 of the bearing embodiment 106 depicted in FIGS. 7 and 8.

Accordingly, through the composite bearing assemblies 156 each of the drive rollers 144 is rotatably secured in a fixed axial position on a respective trunnion 154, and at the same time each drive roller is also universally pivotally secured at this position.

The drive tracks 146 of each track member 124 are defined by a pair of flat parallel track surfaces 184 which closely confine the respective drive rollers 144 but also provide a slight running clearance, so that each of the cylindrical surfaces 148 of the associated drive rollers 144 contacts only one of the drive track surfaces 184 at a time. The drive tracks 146 are similar in configuration and arrangement to the drive tracks 46 of the previously described embodiments except that they are considerably shorter as shown since the constant velocity universal joint 120 of the present embodiment is designed to accommodate a maximum joint angle of only 20°, and the joint 120 is a non-axial-travel joint so that longer drive tracks are not required. Except for the elimination of relative axial travel the joint 120 operates in exactly the same manner as the previously described joints 20 and 20A.

In order to prevent relative axial travel between the trunnion member 122 and the track member 124, the joint 120 includes a universal pivot assembly 220. The pivot assembly 220 comprises a pivot member 222 having an integral spherical ball head 224 which is universally pivotably retained in a conforming segmental spherical socket 226 formed in a socket member 228. The socket member is fixedly secured in any suitable manner, as by the snap ring 230 shown, within an open-ended cavity 232 formed in the axial end of the shaft section 126 of the trunnion member 122. It will be noted that the snap ring 230 also assists in securing the shaft section 126 within the trunnion section 128.

The pivot member 222 includes an integral connection end 233 which is loosely secured to a central portion of a metal bracket member 234, which in turn has three integral lugs fixedly secured in respective grooves 236 formed in the track section 136 of the track member 124 between adjacent pairs of track surfaces 184. The connection end 233 of the pivot member 222 may be loosely secured to the bracket member 234 by a pair of snap rings 238 disposed in axially spaced grooves as shown. The snap rings and grooves are separated by a distance sufficient to provide slight end play (not shown) for the pivot member 222.

The arrangement of the pivot assembly 220 is such that the axis of the pivot member 222 coincides with the axis Y of the track member 124 when the joint angle is 0°. When the joint angle is other than 0°, the end play provided in securing the pivot member 222 to the flange member 234 permits the center of the ball head 224 to orbit or weave with respect to the track member 124 as the track member and the trunnion member 122 orbit or weave with respect to one another as the joint 120 is rotated. At the same time, however, the pivot assembly prevents relative axial travel between the two joint members 122 and 124.

In some instances it may be desirable to utilize a joint such as that of FIGS. 9 and 10 for limited axial travel. This can be readily accomplished by further axially separating the snap rings 238 and their grooves to provide the desired amount of relative axial travel between the joint members 122 and 124. This provides a positive limit for the maximum axial separation.

To prevent entry of water and dirt and to prevent loss of lubricant, the joint 120 may include a dirt seal assembly 240. The seal assembly may be of any suitable construction and may include, for example, a sheet metal retainer 242 which is secured to a flexible boot 244. The boot 244 is secured about the shaft section 126 of the trunnion member 122, and the retainer 242 is disposed in rotatably sealing relation about the outer periphery of the track section 136 of the track member 124 as shown. A similar dirt seal arrangement (not shown) may be provided for the joint 20 of FIGS. 3 and 4 and the joint 20A of FIGS. 5 and 6.

The particular joint 120 shown is intended for use as the inner joint of a pair of joints in series used for front wheel drive of an automotive vehicle in conjunction with the joint 20, as depicted in FIGS. 15–17. Accordingly, the joint is of comparable size and torque capacity to the joint 20.

It should be understood that in place of the joint 120, the joint 20 or the joint 20A could be provided with a universal pivot assembly similar to the assembly 220. In this event the revised joint 20 (or 20A) would become a non-axial-travel joint instead of a joint providing axial travel. This might be desirable, for example, in production of a front wheel drive assembly in order to provide interchangeability of parts of the inner and outer joints.

While all of the embodiments of the invention depicted in the drawings show the use of antifriction bearings for rotatably mounting the drive rollers on the respective trunnions, it will be readily understood that plain bearings could be readily substituted, particularly where cost is a critical factor. In the embodiment of FIGS. 3 and 4, for example, the needle bearing assemblies 70 could be replaced by bronze sleeves fixedly secured to the respective trunnions 54 with the inner cylindrical bearing surfaces 78 of the bearing members 76 disposed against the bronze sleeves in close-fitting plain bearing fashion. Alternatively, the bearing members 76 could be fixedly secured directly to the respective trunnions 54 so that both rotation and universal tilting of the drive rollers 44 would be accommodated by the spherical plain bearing assemblies 74; in effect, this amounts to substitution of spherical plain bearing assemblies for the antifriction bearing assemblies 96 of the embodiment of FIGS. 5 and 6 for accommodating both rotation and universal tilting of the drive rollers 44. Any suitable plain bearing material could be utilized in place of bronze, for example, babbitt, graphited bronze, "Oilite," or a low friction, high strength plastic such as "Teflon."

6. Orbiting and Weaving Explained in More Detail

FIGS. 12 and 13 are schematic sketches to assist in understanding the operation of the three-roller constant velocity joints of the present invention. These figures illustrate the relative orbiting or weaving of the axes X and Y of the members 22 and 24 of the universal joints 20 and 20A as the joints rotate. The axes in FIGS. 12 and 13 are shown at an arbitrarily chosen joint angle of 37°, which is the joint angle also shown in FIGS. 3 and 5. The orbiting or weaving is of the same nature in the joint embodiment of FIGS. 9–11 inasmuch as the pivot assembly 220 provides the necessary flexibility, so that the following explanation also applies to that embodiment as well.

In FIGS. 12 and 13, as is the case in FIGS. 3 and 5, the axis X of the trunnion member 22 is arbitrarily chosen as the non-weaving axis so that the orbiting or weaving occurs with the axis Y of the track member 24. Either axis may be utilized as the non-weaving axis with the other axis accommodating the orbiting or weaving, which is required by the constantly changing positions of the drive rollers 44 in the drive tracks 46 as the joint rotates. The magnitude of weaving or orbiting increases geometrically from a zero amount at 0° joint angle.

As shown in FIGS. 12 and 13, the orbiting or weaving occurs about a joint center Z which is the intersection of the axis X of the trunnion member 22 with a plane defined by the axes of the three trunnions 54. The axis Y of the track member 24 weaves in a generally conical path from a null point on the shaft so that the null point is the apex of the generally conical figure thus generated. The null point may occur at the position of a suitable self-aligning bearing (not shown) supporting the shaft, or it may be a neutral point along a shaft which has universal joints at each end. The average joint angle is thus the angle between the axis X and a line drawn between the null point and the joint center Z, which line forms the conical axis for the path of the weaving axis Y.

The "orbit path" shown in the figures is the path traced by the axis Y on a plane generally perpendicular to this axis, with the plane taken at the position of the joint center Z. This orbit path is generally circular and its maximum displacement defines the magnitude of orbiting about the joint center Z. The magnitude of orbiting in a particular joint design is determined by the average joint angle and is independent of the null point position.

In order to give some idea of the magnitude of orbiting with joints 20 and 20A of the size previously described, the Y axis is displaced from the joint center Z approximately 0.140 inches at a joint angle of 37°. In any given joint design the magnitude of orbiting increases in a geometric fashion from zero at a zero joint angle to a maximum amount at the maximum design angle of the joint.

As previously described, one axis weaves or orbits three times with respect to the other axis for each 360° rotation of the axes. Thus, the orbit path shown in FIGS. 12 and 13 is described three times for each complete rotation of the joint, or in other words a complete orbit of 360° occurs with each 120° rotation of the joint.

It will now be understood that while the average joint angle does not change for any given relationship between the two members of the joint, the instantaneous joint angle does vary slightly as the joint rotates. Thus, the average joint angle in FIG. 3 is the same as the average joint angle in FIG. 5, but the instantaneous joint angle of FIG. 3 is very slightly greater than that of FIG. 5. This is because the axis Y of the track member 24 is at the top of its orbit when the trunnions 54 are in the position of FIG. 3, but the axis Y is in at the bottom of its orbit when the trunnions 54 are in the positions shown in FIG. 5. Thus, when the trunnions are in positions at 30° from the positions shown in FIGS. 3 and 5, the instantaneous joint angle equals the average joint angle (when superimposed on the joint plane); although it would be understood that at this position the axis Y does not actually intersect the axis X but is displaced to one side away from the joint center Z.

7. Roller Track Patterns Explained

As a constant velocity universal joint according to the present invention rotates with the axes at an angle, the drive rollers describe what is referred to as a "roller track pattern." Roller track patterns at three different joint angles 20°, 45° and 49° are depicted in FIG. 14. The patterns shown are the paths of a circle taken at the crowned center of the cylindrical drive surface 48 of each roller 44 as it rolls on a flat drive surface 84 of a drive track 46 at a particular joint angle. The non-axial-travel embodiment of FIGS. 9–11 describes a roller track pattern of the same nature so that the 20° pattern applies to that embodiment as well.

Actual tests demonstrate that the drive rollers follows true rolling paths which trace roller track patterns as shown in FIG. 14. The patterns are not segments of a circle but instead are more sharply curved at the center portion than at the portions at each side. The point of maximum distance from the axis Y of the track member occurs twice for each drive roller with each 360° rotation of the joint, that is, each time the axis of a particular trunnion is perpendicular to the joint plane. The maximum distance increases with increase in the joint angle because it is equal to the "torque arm," which is the distance from the joint center Z to the center of spherical tilting of a drive roller, plus the radius of orbit. The roller track pattern increases in length and in maximum distance as the joint angle is increased because of increasing roller travel and increasing maximum distance. This is advantageous in a joint designed for high torque loads because the maximum pressure between the rollers and tracks occurs in different wear patterns with each different joint angle.

In the axial travel embodiments it will be seen that the roller track patterns occur at different axial positions along the drive surfaces 84 depending upon the axial displacement. However, the patterns are the same for any given joint angle regardless of axial position.

8. The Front Wheel Drive Embodiment of FIGS. 15 through 17

FIGS. 15 through 17 illustrate use of constant velocity three-roller joints according to the present invention in an automotive front wheel drive system, generally designated by the reference numeral 250. The system includes generally a pair of non-axial-travel universal joints 120 used as the inboard joints of the system and a pair of axial-travel type universal joints 20 utilized as the outboard joints of the system. The inboard joints 120 receive the driving torque from an automobile engine and transmission system (not shown) which are connected to the two joints 120 through differential drive gearing 252 of any conventional design. The output members (not shown) of the differential gearing 252 are connected for driving either the trunnion members 122 or the track members 124 of the non-axial-travel universal joints 120. Each of the inboard joints 120 is connected to an outboard joint 20 through rigid connection of the shaft sections 126 or 138 of the joint 120 with the shaft section 38 of the joint 20. If desired, the shaft sections can be integrally constructed. In turn, the trunnion members 22 of the outboard joints 20 are rigidly connected in any suitable manner to the front steerable driving wheels 254 of an automobile or other automotive vehicle.

As is well understood in the automotive art, the differential gearing 252 and the automobile engine and transmission system are carried by the frame of the automobile (not shown) and hence are part of the sprung weight. The driving wheels 254 ride on the roadway surface and are associated with the frame of the automobile through suitable springs and shock absorbers (not shown) and hence are part of the upsprung weight of the vehicle.

When an automobile incorporating the front wheel drive system 250 is driven on a road or highway, the wheels 254 ride on the surface of the roadway. Torque from the automobile engine is transmitted through the transmission system, thence through the differential gearing 252 to the driving wheels. As the automobile rounds a curve or turns a corner, the differential gearing 252 permits the outside wheel on the curve to travel faster, and when the automobile is driven straight ahead, the wheels travel at the same rate of speed, all in the conventional manner.

FIG. 15, which is a top view of the front wheel drive system 250, illustrates the steering of the front wheels 254. Suitable steering gear (not shown), which is actuated by the steering wheel of the automobile and which acts through linkages (not shown) to the wheels 254, causes the two wheels to be simultaneously turned from 0° when the automobile is traveling straight ahead to a maximum turning angle which may be as much as 40°. The maximum turned positions of the wheels in both directions are illustrated in dotted lines in FIG. 15. The turning of the wheels is accommodated through the outboard universal joints 20, and at the same time driving torque from the automobile engine may be transmitted to the wheels. In the alternative, reverse torque may be transmitted from the wheels back to the engine which is coasting when the accelerator of the vehicle is released, in which case the coasting engine is utilized as a means for slowing down the vehicle.

At the same time that the wheels 254 of the front wheel drive system 250 are being driven and steered, the suspension system of the vehicle accommodates unevenness of the roadway by permitting the wheels to move up and down in jounce and rebound. FIG. 16, which is a front view of the front wheel drive system 250, illustrates in dotted lines how the driving wheels 254 may move up and down, requiring the inner joints 120 and the outer joints 20 to accommodate 20° of jounce and 20° of rebound from the central neutral position shown in solid lines. As this occurs, the distances between the respective inboard joints 120 and outboard joints 20 must change. Hence, at least one of the joints on each side of the vehicle must be able to accommodate relative axial shifting, or else a conventional slip spline must be utilized somewhere in each shaft connecting the joints. It will be noted that FIG. 16 illustrates the most stringent condition, that in which the suspension causes the wheels to travel straight up and down in jounce and rebound, so that the shaft angularity imposed must be accommodated in both joints.

Many, if not most, automobiles permit the wheels to cant at least partly so that the angularity imposed is less, at least at the outboard joint.

As previously described, the outboard joints 20 of the axial-shift type and can thus accommodate the distance difference as the driving wheels travel in jounce and rebound. The inboard joints 120 may thus be of the non-axial-travel type as described.

The arrangement of joints in the front wheel drive system 250 is different from that employed in existing front wheel drive vehicles of which applicant is aware. Typically, existing front wheel drive automobiles utilize outboard joints of the non-axial-travel type and inboard joints of the axial-travel type. Presumably this is because those working in the automotive art have not been able to devise axial-travel type universal joints which would permit sufficient angularity to be used as the outboard or steering joints. Outboard non-axial-travel joints of prior art front wheel drive systems have often been of the Rzeppa type. Prior art three-roller joints have been conventionally used as the inboard joints since they are adaptable for providing relative axial travel.

By reason of the improved constant velocity three-roller type joints of the present invention, which can achieve joint angles of approximately 50°, applicant has been able to utilize three-roller type joints as the outboard or steering joints of a front wheel drive system. This provides two very important advantages. First, the arrangement reduces the unsprung inertia associated with the driving wheels which advantageously permits a smoother ride. Second, applicant's system eliminates the necessity of driving the drive rollers of the joint at an angle against the drive tracks as the driving wheels move up and down in jounce and rebound. These advantages are most clearly illustrated in comparing applicant's system of FIG. 17 with FIG. 18, which illustrates a present commercial type front wheel drive system.

As seen in FIG. 18, a typical prior art system utilizes axial-travel type inboard joints 321, which may be of the "Tri-POt" type described and illustrated in the SAE article referred to at the beginning of this specification, in connection with non-axial-travel type outboard joints 323, which may be of the Rzeppa type also shown in the SAE article. The inner three-roller joints 321 include track members 325 which are directly connected to the differential gearing and are thus all carried as part of the sprung weight of the vehicle. However, the trunnion members 327 of the inner joints 321, the outer joint 323, and the connecting shaft 329 are all directly coupled to the driving wheels of the vehicle and thus all add to the unsprung inertia. With the prior art system of FIG. 18, each time the driving wheels move up and down in jounce and rebound, they carry with them all of these parts, thus adding considerably to the unsprung inertia load.

The front wheel drive system of the present invention may be contrasted with the prior art system of FIG. 18 by reference to FIG. 17, which is an enlarged and more detailed illustration of one side of the system pictured in FIG. 16. As shown in FIG. 17, only the trunnion members 22 of the outboard joints 20 are directly coupled to the driving wheels 254. The track members 24, the connecting shafts, and the inboard joints 120 are all directly coupled to the differential 252 which is part of the sprung weight carried by the automobile frame.

Hence, the unsprung inertia in applicant's system is significantly reduced.

In further contrast as illustrated in applicant's system of FIG. 17, the track member 24 of each outboard joint 20 permits each driving wheel to jounce and rebound without requiring that the drive rollers 44 move against any incline. By reference to FIG. 17 it will be seen that as the wheel moves from the neutral position as shown in phantom lines to the fully depressed position shown in solid lines, the drive rollers have traveled in the drive tracks 46 in a direction always parallel to the axis Y of the track member.

In the prior art front wheel drive system FIG. 18, the drive rollers 331 of the inboard joints 321 must move against the inclined tracks 333 at an angle which is substantially equal to the joint angle each time that each drive roller axis is substantially perpendicular to the joint plane. This occurs six times in each 360° rotation of the driving wheels. By the same token, when the engine is used as a brake and the torque is reversed, six pulsations will be transmitted from the trunnion member to the track member of the inboard joint when it is at an angle. Thus, the front wheel drive system of the prior art shown in FIG. 18 requires additional torque in a pulsating fashion to drive the driving wheels when the wheel has moved in jounce or rebound. In addition, six pulsations are imparted from the wheels to the engine with each wheel rotation when the engine is used as a brake and the wheels are in other than the neutral position with respect to jounce and rebound.

Variations and modifications may be effected without departing from the scope of the novel concepts of the present invention.

I claim:

1. In a constant velocity universal joint of the three-roller type including three drive rollers carried by a trunnion member with said rollers disposed in driving engagement with respective drive surfaces formed on a track member, the improvement comprising:
   a. bearing means securing each of said rollers to said trunnion member for rotation and universal pivoting relative thereto while maintaining each roller at a fixed distance from the axis of said trunnion member,
   b. whereby said rollers pivot universally on said trunnion member while in rolling engagement with said track member to accommodate relative weaving of the axes of said members when the joint is rotated with the axes of the members angularly disposed.

2. A constant velocity universal joint according to claim 1 in which each of said rollers has a generally cylindrical outer surface in rolling engagement with respective drive surfaces on said track member.

3. A constant velocity universal joint according to claim 2 in which the cylindrical axis of said outer surface of each roller is maintained substantially parallel to the respective drive surfaces on said track member.

4. A constant velocity universal joint according to claim 1 in which the drive surfaces on said track member are formed as three sets of pairs of flat parallel surfaces also parallel to and equally spaced from the axis of said track member.

5. A constant velocity universal joint according to claim 4 in which said rollers and said drive surfaces provide for a predetermined amount of relative axial travel between said trunnion member and said track member.

6. A constant velocity universal joint according to claim 1 including:
   a. three trunnions each rotatably and universally pivotally carrying one of said rollers, and
   b. means connected at each end of each of said trunnions for fixedly securing said trunnions to said trunnion member with the axes of said trunnions equiangularly spaced and perpendicular to the axis of said trunnion member.

7. A constant velocity universal joint according to claim 6 including:
   a. three drive arms fixedly secured to said track member in cantilever fashion,
   b. each of said arms being disposed between an adjacent pair of rollers and having said drive surfaces formed thereon in rolling engagement with the respective rollers.

8. A constant velocity universal joint according to claim 1 including:
   a. a trunnion rotatably and universally pivotally carrying each of said rollers,
   b. means fixedly securing the radially outward end of each of said trunnions to said trunnion member with the axes of said trunnions member, and
   c. three grooves formed generally parallel to the axis of said track member and having a pair of said drive surfaces defining opposed sides of each of said grooves.

9. A constant velocity universal joint according to claim 1 including:
   a. a trunnion rotatably and universally pivotally carrying each of said rollers,
   b. means fixedly securing the radially inward end of each of said trunnions to said trunnion member with the axes of said trunnions equiangularly spaced and perpendicular to the axis of said trunnion member, and
   c. three grooves formed generally parallel to the axis of said track member and having a pair of said drive surfaces defining opposed sides of each of said grooves.

10. A constant velocity universal joint according to claim 1 including means operatively associated with said trunnion member and said track member for preventing relative axial travel therebetween.

11. A constant velocity universal joint according to claim 1 in which said bearing means comprise a spherical plain bearing supporting each of said drive rollers.

12. A constant velocity universal joint according to claim 11 in which said bearing means include a plurality of generally cylindrical roller bearings rotatably supporting each of said drive rollers with respect to said trunnion member.

13. A constant velocity universal joint according to claim 1 in which:
   a. said bearing means comprise a plurality of tapered roller bearings operatively associated with each of said drive rollers and arranged with thier axes generally parallel to the axes of rotation of the respective rollers, and
   b. each of said drive rollers includes an annular member having a radially inwardly facing segmental spherical surface in antifriction bearing contact with the roller bearings associated with said roller.

14. A constant velocity universal joint according to claim 1 in which said bearing means comprise:
  a. a plurality of tapered roller bearings operatively associated with each of said drive rollers and arranged with their axes in at least two circumferential rows about the axis of rotation of each said drive rollers for universally pivotally supporting said rollers in antifriction spherical bearing fashion, and
  b. an additional bearing operatively associated with each of said drive rollers for rotatably supporting the respective rollers.

15. A constant velocity universal joint according to claim 14 in which each of said additional bearings includes a plurality of generally cylindrical roller bearings rotatably supporting said drive rollers in antifriction radial bearing fashion.

16. A constant velocity universal joint according to claim 1 in which said bearing means comprise:
  a. a set of inner and outer elements associated with each of said drive rollers and having spaced complementary segmental spherical bearing race surfaces, and
  b. a plurality of ball bearings disposed in spaced relation to one another between the inner and outer elements of each of said sets and supporting the outer element thereof in antifriction spherical and radial bearing fashion relative to the inner bearing element of each set.

17. In a constant velocity universal joint of the three-roller type including three drive rollers carried by a trunnion member with said rollers disposed in driving engagement with respective drive surfaces formed on a track member, the improvement comprising:
  a. a generally cylindrical outer surface on each of said drive rollers disposed in rolling engagement with respective drive surfaces, and
  b. means operatively associated with said drive rollers to accommodate relative weaving of the axes of said members when the joint is rotated with the axes of the members angularly disposed.

18. In a universal drive employing two universal joints for providing universal pivoting in two angularly disposed planes in which drive at least one of the universal joints is of the three-roller type including three drive rollers carried by a trunnion member with the rollers disposed in driving relation with a track member and in which drive the other universal joint includes two members operatively associated for universal drive therebetween, the improvement comprising;
  a. drive surfaces formed on said track member parallel to the axis thereof and having said drive rollers disposed in rolling engagement on said drive surfaces, and
  b. means connecting said track member with its axis in axial alignment with the axis of one of the members of said other joint.

19. A universal drive according to claim 18 in which said one joint includes means securing each of said rollers to said trunnion member for universal tilting relative thereto while maintaining each roller at a fixed distance from the axis of said trunnion.

20. A universal drive according to claim 18 in which said one joint includes:
  a. a generally cylindrical outer surface on each of said drive rollers disposed in rolling engagement with the respective drive surfaces on said track member, and
  b. means operatively associated with said drive rollers to accommodate relative weaving of the axes of the members of said one joint when the joint is rotated with the axes of the members angularly disposed.

21. A universal drive according to claim 18 in which said other universal joint is of a constant velocity type.

* * * * *

UNITED STATES PATENT OFFICE
CERTIFICATE OF CORRECTION

Patent No. 3,818,721 Dated June 25, 1974

Inventor(s) Gunnar A. Wahlmark

It is certified that error appears in the above-identified patent and that said Letters Patent are hereby corrected as shown below:

In the title block, "Assignee: Wahlmark System, Inc." should read "Assignee: Wahlmark Systems, Inc."

In Column 1, Line 44, "Peugot" should read --Peugeot--.

In Column 3, Line 18, "deficiences" should read --deficiencies--.

In Column 6, Line 48, "heads with engage" should read --heads which engage--.

In Column 8, Line 3, "0°0" should read --0°--.

In Column 11, Line 33, "20°" should read --about 20°--.

In Column 12, Line 22, "rotatably" should read --rotatable--.

In Column 15, Line 16, "upsprung" should read --unsprung--.

In Column 16, Line 4, "joints 20 of" should read --joints 20 are of--.

In Column 16, Line 42, "Tri-POt" should read --Tri-Pot--.

In Column 18, Line 26, "trunnions member" should read --trunnions equiangularly spaced and perpendicular to the axis of said trunnion member--.

Signed and sealed this 14th day of January 1975.

(SEAL)
Attest:

McCOY M. GIBSON JR.
Attesting Officer

C. MARSHALL DANN
Commissioner of Patents